Nov. 25, 1969    E. O. BRANNON ET AL    3,480,039
CONTROL VALVE

Filed Feb. 26, 1968    2 Sheets-Sheet 1

Inventors:
Edward O. Brannon
Irving J. Petersen
By Hofgren, Wegner,
Allen, Stellman & McCord    Attys United States Patent Office 3,480,039
Patented Nov. 25, 1969

3,480,039
CONTROL VALVE
Edward O. Brannon and Irving J. Petersen, Racine, Wis., assignors to Racine Hydraulics, Inc., a corporation of Wisconsin
Filed Feb. 26, 1968, Ser. No. 708,273
Int. Cl. F16k 11/14, 11/18
U.S. Cl. 137—596.2                8 Claims

ABSTRACT OF THE DISCLOSURE

This invention relates to a three-way control valve having a pair of poppet valve members under the control of a pair of pilot valves provided for control of an operated member connected to a control port of the control valve to have flow either to or from the operated member or to provide a neutral, hold, position, with one of the poppet members functioning as a leakproof check valve and with the poppet members each performing as metering or feathering valves in alternate directions of movement of the operated member and with provision made for one of the pilot valves to function as a relief valve for system pressure.

Background of the art

Previous valving systems have been provided to provide for the control of movement of an operated member and to provide added safety features, such as holding the operated member in position, and providing for a relief pressure setting, but have not embodied a three-way control valve utilizing a pair of poppet valve members, with these members performing plural functions including leakproof check valve operation and adjustable metering control in both directions of operation of the operated member.

Summary of the invention

An object of this invention is to provide a new and improved three-way control valve for controlling fluid flow relative to an operated member.

Still another object of the invention is to provide a three-way control valve having a pair of poppet valve members, wherein one poppet valve member provides for flow of fluid to the operated member and the other poppet valve member functions as a leakproof check valve to hold the operated member in position and also functions at other times to cause return flow from the operated members, with poppet valve members functioning as pressure controls during flow established by their operation.

An additional object of the invention is to provide a three-way control valve as defined in the preceding paragraph wherein each of the poppet valve members is provided with a pilot valve and with one of the pilot valves including a pilot valve member which is yieldably held in closed position to cause the one poppet valve member to set pressure to open the second poppet valve member and establish flow to the operated member and which can yield to cause pump flow to tank thereby acting as a relief valve for pump pressure. The other pilot valve includes a pilot valve member directly mechanically operated to cause operation of the associated poppet valve member and to set the rate of metering control to be maintained by the poppet valve member, with the valve members related to provide for a multiplication of force relative to that applied on the pilot valve member as against that controlled by the poppet valve member.

Brief description of the drawings

Further objects and advantages will become apparent from the following detailed description taken in connection with the accompanying drawings in which.

Description of the invention

Figure 4:
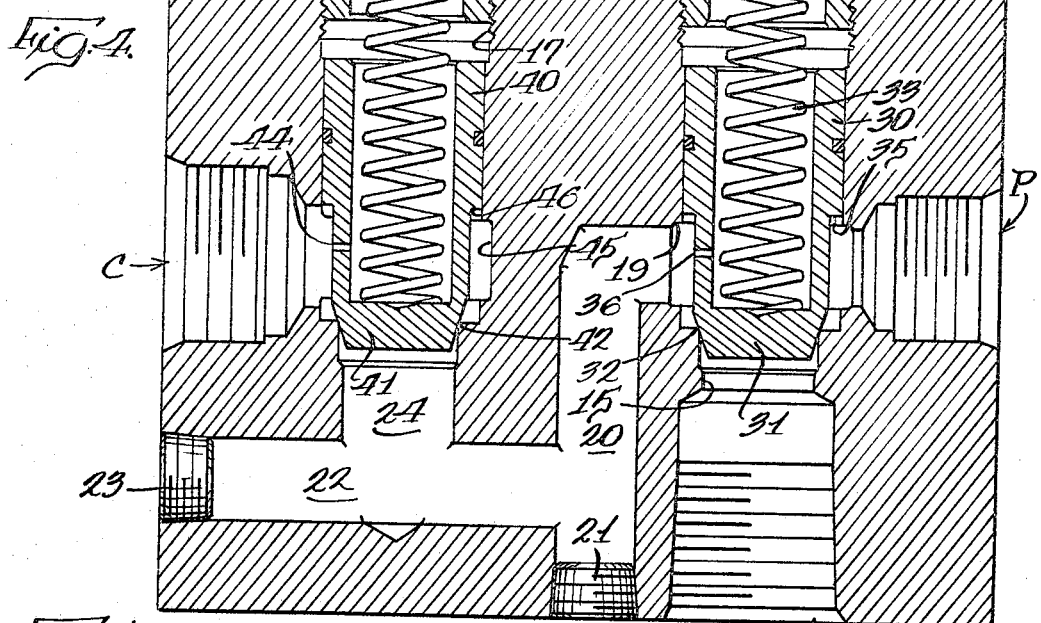
FIG. 4 is a plan section, taken generally along the line 4—4 in FIG. 2.

The control valve embodying our invention has a valve body indicated generally at 10 with an inlet or pressure port P at one side thereof, a tank port T at the front thereof, and a control port C at the side of the body opposite the inlet port P. As shown particularly in FIG. 4, the tank port T is formed as a continuation of a bore 15 formed in the valve body which extends to the rear of the body and which is capped by a threaded cap 16. A second bore 17 is formed in the valve body and extends parallel to the bore 15 and intersects the control port C. The bore 17 is capped at the rear of the body by a threaded cap 18. The inlet port P intersects the bore 15 and flow from the inlet port to the control port C is by way of an annular enlargement 19 of bore 15 and a connecting passage means having a passage 20 plugged by plug 21 and a passage 22 intersecting passage 20 and which is plugged by plug 23. The passage 22 connects to a transverse passage 24 formed as part of the bore 17 and flow from passage 24 to the control port C is controlled by means hereinafter described.

The bore 15 mounts a hollow poppet valve member 30 for movement therein with a front tapered end 31 coacting with a shoulder 32 in the bore 15 defining a valve seat. When the valve member is closed against the seat, fluid communication between the inlet port P and the tank port T is blocked. The poppet valve member is urged toward its seated position by a spring 33 positioned within the hollow valve member and having one end acting thereagainst and the other end against an interior surface in the threaded cap 16. The front part of the poppet valve member 30 is of a reduced diameter so as to have no effect on communication from the inlet port P to the passage means leading toward the control port C and particularly flow through the enlarged annular area 19 surrounding the poppet valve member. This reduction in diameter provides an enlarged external shoulder 35 which is subjected to fluid at inlet pressure as is the area of the tapered end of the poppet valve member upstream of the valve seat edge 32 for a purpose hereinafter more fully described. In the reduced diameter portion of the poppet valve member, an orifice 36 extends through the wall thereof to place the interior of the poppet valve member in fluid communication with the exterior thereof, as part of the pressure control function of the poppet valve member to be described.

A second hollow poppet valve member 40 is movably positioned in the valve body bore 17 and has a front tapered end 41 coacting with an annular edge 42 of bore 17 forming a valve seat. The valve member is urged toward its seat by a spring 43 disposed within the hollow poppet valve member and at one end engaging the valve member and having its other end engaged against an interior surface of the threaded cap 18. The poppet valve member has a reduced diameter in the front section thereof and an orifice 44 extends through the wall of the valve member to place the interior of the valve member in fluid communication with the exterior area and particularly the enlarged annular section 45 of the bore surrounding this reduced diameter section. This reduced diameter results in an external shoulder 46 which can be subjected to pressure to urge the poppet valve member in a direction to open the poppet valve member and move it away from the seat 42.

Figure 1:
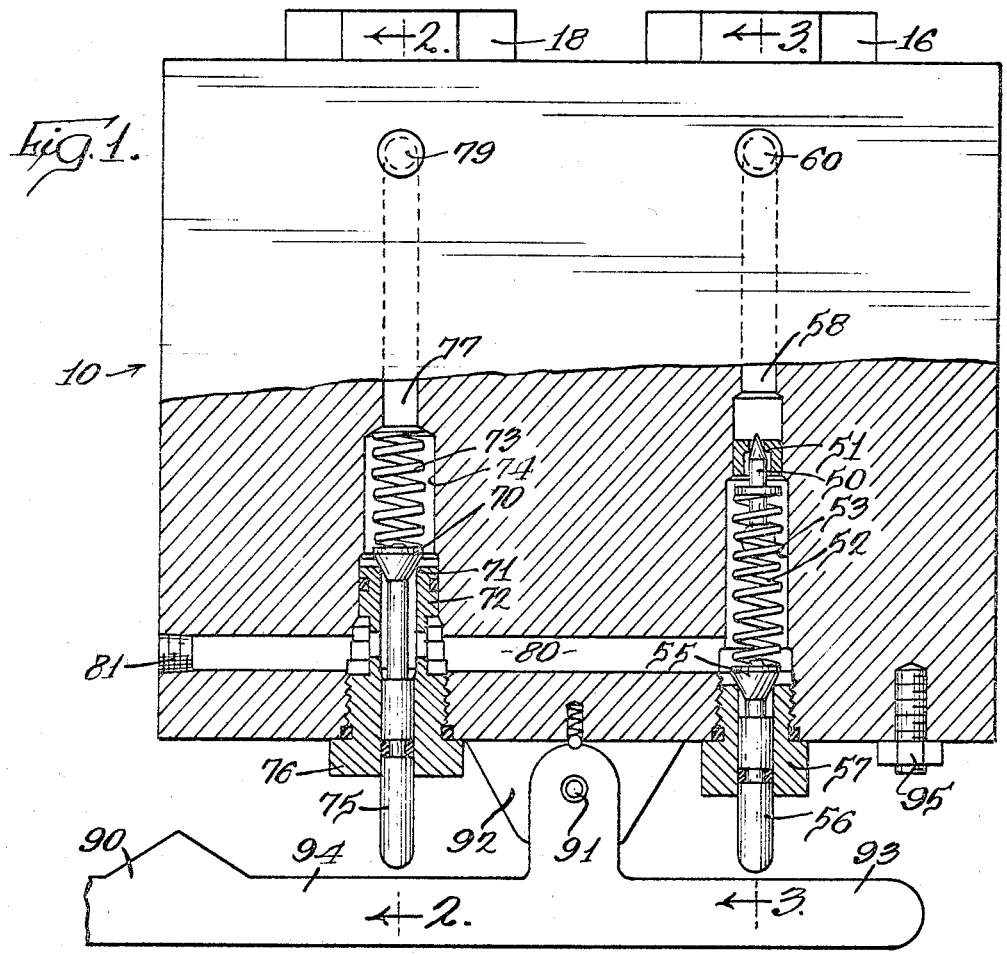
FIG. 1 is a plan view of the control valve with a part of the valve body broken away.
Figure 2:
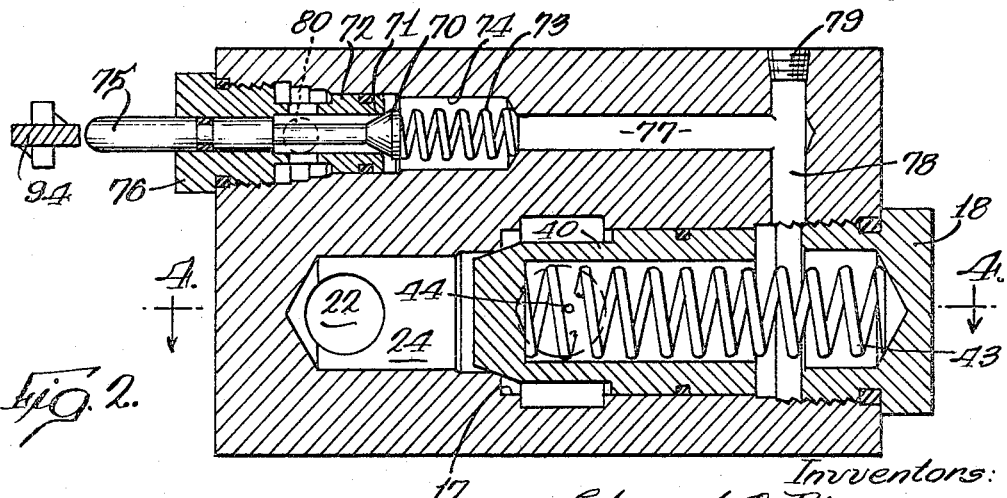
FIG. 2 is a vertical section, taken generally along the line 2—2 in FIG. 1.
Figure 3:
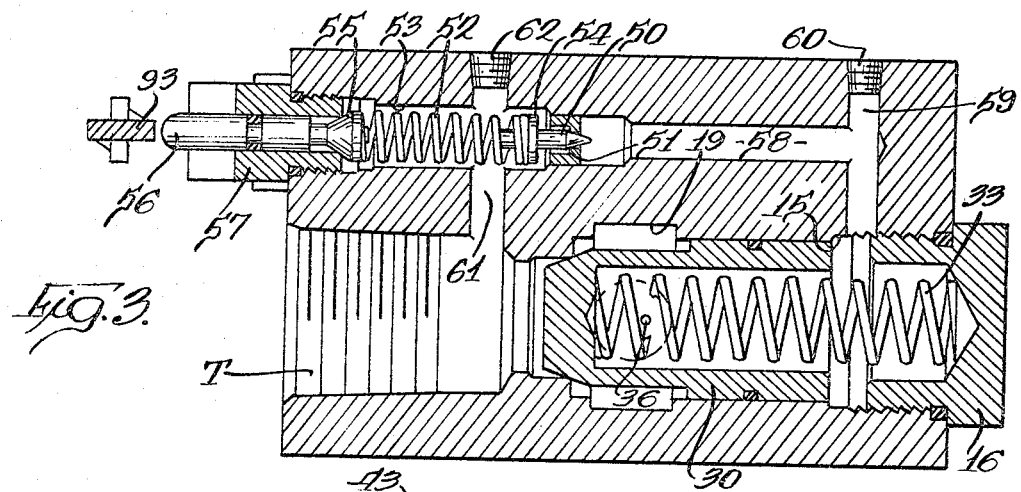
FIG. 3 is a vertical section, taken generally along the line 3—3 in FIG. 1.

A first pilot valve for controlling the first poppet valve member 30 is shown particularly in FIGS. 1 and 3. The pilot valve includes a needle valve member 50 coacting with a shouldered seat 51 and urged into seated relation by a spring 52 positioned within a bore 53 in the valve body and acting between a flange 54 on the valve member and an operating plunger cap 55. The cap is positioned at the end of a plunger 56 extending out through an apertured threaded plug 57 which closes off the bore 53 with suitable fluid seals being provided. The pilot valve member is subjected to pressure existing within the first poppet valve member 30 by means of connecting passage means, including a passage 58 formed by a section of the bore 53 and an intersecting vertical passage 59 extending downwardly to intersect the bore 15 and plugged at its upper end by a plug 60. The section of the bore 53 downstream of the valve seat 51 connects to the tank port T by a vertical passage 61 which is plugged at the top of the valve body by a plug 62.

The second poppet valve member 40 is, in part, controlled by a pilot valve having a poppet valve member 70 normally urged to closed position against a valve seat 71 formed in an insert 72 by a spring 73 positioned within a bore 74 in the valve body. The poppet valve member 70 is formed integrally with a plunger 75 extending outwardly of the valve body through an apertured threaded cap 76 for operation by a member to be described. The cap 76 and suitable fluid seals close the bore 74. The pilot valve member 70 is in fluid communication with the bore 17 for the second poppet valve member 40 by means of a passage 77 which is a continuation of the bore 74 and an intersecting vertical passage 78 which is plugged at its upper end by a plug 79. The portion of the bore 74 downstream of the valve seat 71 is connected with the tank port T by means of a transfer passage 80 plugged at one side of the body by a plug 81 and which extends to intersecting relation with the passage 61 which extends from the first pilot valve to the tank port T.

Three different modes of operation are provided, dependent upon actuation of neither of the first and second pilot valves, or upon actuation of one or the other thereof. This control, in the embodiment disclosed, is provided by manual means in the form of a manually-operated lever 90, as shown in FIG. 1, pivoted at 91 to an ear 92 extending from the valve body and having a section 93 aligned with the plunger 56 for selective engagement with the plunger 56 of the first pilot valve and a section 94 in position for selective engagement with the plunger 75 of the second pilot valve. It should be noted that it is within the contemplation of our invention that some of mechanism providing for remote power operation of the plungers 56 and 75 could be utilized in place of the manual lever. Further, although the pilot valves have been shown as mounted in bores formed integrally in the valve body 10, it is within the contemplation of our invention to have the pilot valves at a remote location and operatively associate them with the respective poppet valve members by means of connecting lines.

The pivoting of the manual lever 90 in a direction to urge the plunger 56 inwardly of the valve body can be adjustably set to a limit position by an adjustable member 95 threaded in the valve body 10 which provides a maximum setting of compression on the pilot valve spring 52 to provide a setting for relief action more particularly described in connection with the operation of the control valve.

Figure 5:
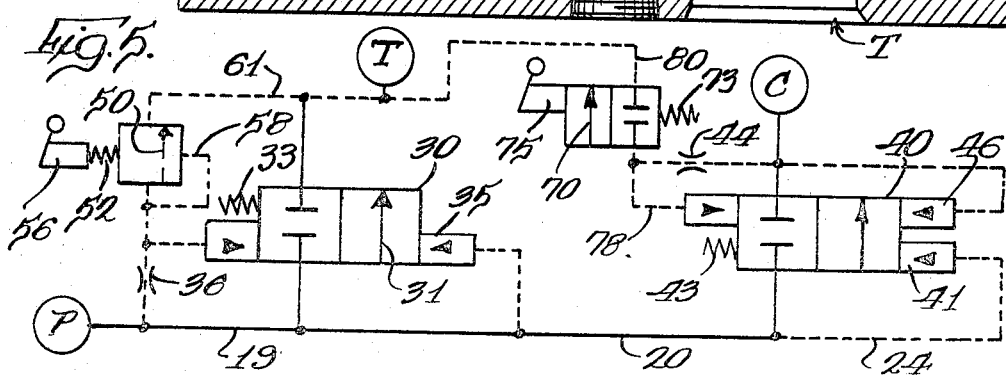
FIG. 5 is a schematic drawing of the circuit of the valve using USASI symbols.

In describing the operation of the control valve, reference can be made to FIGS. 1 to 4 showing the structure, as well as FIG. 5, showing the circuit of the valve in schematic form. First, with the parts as positioned as shown in the drawings, with the manual lever 90 out of engagement with the plungers for both pilot valves, the control valve is set in a neutral, hold position in which there is no flow through the control port C. Fluid from a pressure source entering the inlet port P acts on the external shoulder 35 of the first poppet valve member as well as the exposed portion of the tapered end 31 to lift the poppet valve member off the valve seat 32 and permit direct flow to tank. This movement of the first poppet valve member is only opposed by the relatively insignificant amount of force provided by spring 33 and is not opposed by the first pilot valve, since the pilot valve spring 52 is relaxed. Because of this, the interior of the first poppet valve member is effectively connected to the tank port T through the passages 58, 59 and 61. Pressure fluid through the passage means including the passages 20, 22 and 24 can also act against the end of the second poppet valve member 40, however, this valve remains closed because of the load of an operating member connected to control port C which creates forces acting within the interior of the bore 17 (by flow communication through orifice 44) in the same direction as the spring 43 to hold the second poppet valve member closed. More particularly, the forces created by the load cause the second valve member 40 to function as a leakproof check valve, since the forces cause the tapered part 41 of the second poppet valve member 40 to be held tightly against the seat 42 and the second pilot valve member 70 is held against its seat 71 both by the spring 73 as well as the positive pressure existing in the passages 77 and 78 and acting in a direction to hold the pilot valve member 70 closed.

Next, assuming, as an example, that the operating member is a cylinder controlling the elevation of a member and it is desired to elevate the member a further distance, the manual lever is rotated about its pivot in a direction to advance the plunger 56 of the first pilot valve member inwardly of the valve body 10. This compresses the pilot valve spring 52 to forcibly hold the pilot valve member 50 against its seat 51 to cause a pressure to exist in bore 15 which acts on the end of the poppet valve member 30 having a greater effective area than the external shoulder 35 thereof to hold the tapered end 31 against the seat 32 and prevent dumping of pressure fluid directly from inlet port P to the tank port T. As a result, pressure fluid at full system pressure acts against the end of the second poppet valve member 40 which, in order to satisfactorily perform work must be at a pressure greater than that exerted by the load being moved, with the result that the second poppet valve member opens from its seat 42 to permit flow out of the control port C to the operated member. During this operation of lifting the load, the first poppet valve member 30 functions as a pressure control with the orifice 36 providing a pressure drop across the poppet valve member and with the tapered end 31 of the poppet valve member coacting with the valve seat 32 to meter a certain volume of fluid out to the tank port T to obtain the desired pressure. This pressure can be varied, dependent upon the position of the manual lever 90 and the extent to which it presses the spring 52 to thus control the force applied to the pilot valve member 50 and the hydraulic force required to open it. Additionally, the maximum system pressure can be established by determining the extent to which the lever 90 is pivoted as limited by the adjustable member 95 so that at full pressure the spring 52 can function as the spring of a relief valve to relieve system pressure when the setting is exceeded.

The final mode of operation is accomplished by pivoting the manual lever in the opposite direction about the pivot 91 to move thre plunger 75 of the second pilot valve inwardly and at the same time permit full outward extension of the plunger 56. This operation permits flow from the operated member into the control port C and from there to tank port T. Inward movement of the plunger 75 moves the pilot valve poppet 70 against the spring 73 away from its seat 71 whereby the pressure within the bore 17 acting in a direction to hold the second poppet valve member 40 against its seat is relieved and pressure created by the load acting against the external shoulder 46 as well as the exposed part of the tapered section 41 of the valve causes the second poppet valve member to open and by moving away from seat 42 to connect the control port C to the passage 24. The passage through connecting passages 20 and 22 connects to tank port T since, at this time as previously described, when the plunger 56 is not depressed the first poppet valve member 30 is away from its seat 32 so as to connect the annular chamber 19 to tank port T whereby fluid can flow from both the inlet port P and the control port C to tank port T. The pilot valve poppet 70 is directly mechanically controlled without any intermediate spring connection whereby the position of the poppet valve member 70 can be accurately established to thus cause the second poppet valve member 40 to function as a flow control valve and with the rate of flow being accurately established.

From the foregoing, it will be seen that a three-way control valve has been provided wherein a pair of poppet-type valves are associated in a manner to have one of the poppet valves function as a leakproof check valve as well as to have metered flow in both directions when selectively in operation and with the operation of the poppet valve members being controlled by pilot valves which may be remotely located and which have force multiplication in association with the poppet valve members whereby a relatively small amount of pilot force controls a much larger force. Additionally, the pilot valve for controlling the supply of system pressure to the load has provisions for additionally functioning as a relief valve to set the maximum system pressure.

We claim:

1. A three-way control valve for controlling fluid flow relative to an operated element comprising: a valve body having an inlet port, a control port, and a tank port; first and second normally closed poppet valve members movably mounted in said body with the first poppet valve member movable to a closed position to block communication between the inlet and tank ports; first and second pilot valve members for said first and second poppet valve members respectively; a three-position control system for selectively actuating said first pilot valve member for flow out from the control port, said second pilot valve member for flow to said control port, and a neutral position to block fluid flow relative to the control port; means responsive to actuation of said first pilot valve member to subject said first poppet valve member to inlet pressure tending to maintain the first poppet valve member closed with metering of the flow out from the control port; and means enabling said second pilot valve member to control said second poppet valve member to provide either metered flow from the operated element to the control port or to have the second poppet valve member function as a check valve when said control system is in neutral position.

2. A control valve as defined in claim 1 wherein said first pilot valve member is yieldably-held closed to cause fluid to flow out from the control port and is connected to the tank port and subjected to pump pressure to function as a relief valve.

3. A three-way control valve for controlling flow relative to an operated member having a valve body with first and second poppet valve members movably mounted therein, means including the first of said poppet valve members to control the flow to the operated member and meter flow, and means controlling the second poppet valve member to have the latter poppet valve member function as either a check valve against flow from the operated member or permit flow from the operated member and provide metering thereof.

4. A control valve as defined in claim 3 wherein the first mentioned means includes a pilot valve subject to pump pressure to control the operation of the first poppet valve member and also function as a relief valve.

5. A three-way control valve comprising a valve body having an inlet port, a tank port and a control port for connection to an operated member; first and second bores in said body communicating with said inlet port and the control port respectively and a connecting passage therebetween, said first bore also communicating with the tank port; a first poppet valve member seatable on a valve shoulder in said first bore to block fluid communication between the inlet and tank ports, a second poppet valve member in said second bore and seatable on a shoulder between said passage and the control port, a spring urging the second poppet valve member toward its seat; and means providing three different modes of operation including a neutral hold operation in which the first poppet valve member is off its seat to permit fluid to flow from the inlet port to the tank port and the second poppet valve member is on its seat to block flow from the operated member, an operation in which the first poppet valve member is on its seat to block flow to the tank port and pressure fluid opens the second poppet valve member to flow to the control port, and a third operation wherein both poppet valve members are off their seats to have flow to the tank port from both the control and inlet ports.

6. A three-way contol valve comprising a valve body having an inlet port, a tank and a control port for connection to an operated member; first and second bores in said body communicating with said inlet port and the control port respectively and a connecting passage therebetween, said first bore also communicating with the tank port; a first poppet valve member seatable on a valve shoulder in said first bore to block fluid communication between the inlet and tank ports, said poppet valve member being hollow and having an orifice in the wall thereof and an external shoulder both in communication with the inlet port, a first pilot valve in communication with said bore and having an outlet to the tank port whereby pressure on said external shoulder will hold the first poppet valve member open when the pilot valve is open and closing of the pilot valve member will create an opposing force to the force of the external shoulder, and a spring coacting with said orifice to cause said poppet valve to function as a pressure control; a second hollow poppet valve member in said second bore and seatable on a shoulder between said passage and the control port, a spring urging the second valve member toward its seat to cause functioning as a check valve against reverse flow from the operated member, said second poppet valve member having an external shoulder and an orifice through the wall thereof communicating with the control port, and a second pilot valve in communication with the second bore to either cause functioning of the second poppet valve member as a check valve or as a pressure control valve in flow of fluid from the operated member to the tank port; and means for control of said pilot valves to provide for either flow to or from the operated member or for a neutral hold position.

7. A control valve as defined in claim 6 wherein said first pilot valve includes a normally open valve member, and means for yieldably holding said pilot valve member closed to cause flow to the operated member with the spring providing a pressure relief for flow to the tank port, the ratio of areas between the pilot valve member and those of the first poppet valve member acted upon by system pressure providing for amplification of forces controlling the last-mentioned member.

8. A control valve for controlling the position of an operated member including a hollow poppet valve member and a coacting valve seat providing a leakproof check valve against flow to tank, means for alternatively operating said poppet valve member as a flow control metering flow to tank including an external shoulder responsive to pressure to open the poppet and an orifice creating a pressure drop across the poppet, means for causing the poppet valve member to control flow and adjustably set the flow control rate including a pilot valve normally closing a passage to tank with the pilot valve member having a control area substantially less than that of said shoulder to provide force amplification, and a handle positioned to operate directly against said pilot valve member.

References Cited
UNITED STATES PATENTS
3,216,448   11/1965   Stacey _____ 137—596.2

HENRY T. KLINKSIEK, Primary Examiner